(12) United States Patent
Klausmeier et al.

(10) Patent No.: US 7,672,301 B2
(45) Date of Patent: Mar. 2, 2010

(54) DISTRIBUTION STAGE FOR ENABLING EFFICIENT EXPANSION OF A SWITCHING NETWORK

(75) Inventors: Daniel E. Klausmeier, Los Gatos, CA (US); Edward Sprague, Woodside, CA (US)

(73) Assignee: Ciena Corporation, Linthicum, MD (US)

(*) Notice: Subject to any disclaimer, the term of this patent is extended or adjusted under 35 U.S.C. 154(b) by 1252 days.

(21) Appl. No.: 10/428,048

(22) Filed: May 2, 2003

(65) Prior Publication Data

US 2005/0157713 A1 Jul. 21, 2005

Related U.S. Application Data

(60) Provisional application No. 60/377,377, filed on May 2, 2002, provisional application No. 60/377,374, filed on May 2, 2002, provisional application No. 60/377,375, filed on May 2, 2002.

(51) Int. Cl.
*H04Q 11/00* (2006.01)
(52) U.S. Cl. .................................................. 370/388
(58) Field of Classification Search ................. 370/351, 370/352, 353, 355, 356, 360, 388, 396, 395.41, 370/400
See application file for complete search history.

(56) References Cited

U.S. PATENT DOCUMENTS

| | | | | |
|---|---|---|---|---|
| 4,425,640 | A * | 1/1984 | Philip et al. | 370/388 |
| 4,807,280 | A * | 2/1989 | Posner et al. | 370/388 |
| 5,321,813 | A | 6/1994 | McMillen et al. | |
| 5,517,495 | A | 5/1996 | Lund et al. | |
| 5,987,027 | A * | 11/1999 | Park et al. | 370/360 |
| 6,188,700 | B1 * | 2/2001 | Kato et al. | 370/477 |
| 6,208,667 | B1 | 3/2001 | Caldara et al. | |
| 6,212,182 | B1 | 4/2001 | McKeown | |
| 6,285,680 | B1 * | 9/2001 | Steinka et al. | 370/352 |
| 6,343,075 | B1 * | 1/2002 | Klausmeier et al. | 370/388 |
| 2002/0075821 | A1 * | 6/2002 | Gerakoulis | 370/388 |
| 2003/0063626 | A1 * | 4/2003 | Karlquist | 370/503 |
| 2003/0099247 | A1 * | 5/2003 | Toutant et al. | 370/401 |

OTHER PUBLICATIONS

International Search Report, dated Nov. 25, 2003 for PCT/US03/13862.

* cited by examiner

*Primary Examiner*—Hassan Kizou
*Assistant Examiner*—Joshua Smith
(74) *Attorney, Agent, or Firm*—Clements Bernard PLLC; Christopher L. Bernard; Tyler S. Brown

(57) ABSTRACT

A distribution stage is disclosed comprising a plurality of inputs coupled to a plurality of first stage switching devices, a plurality of outputs coupled to a plurality of second stage switching devices, and a distribution configuration. The distribution configuration is configured to receive a plurality of bandwidth units (BU's) from each first stage switching device, and to distribute at least one BU from each first stage switching device to each second stage switching device, such that each second stage switching device is assured of receiving at least one BU from each first stage switching device. In effect, the distribution stage ensures that each first stage switching device has a logical link to each second stage switching device. In one embodiment, the distribution stage is configured in accordance with a distribution configuration that is static. Because the distribution configuration of the distribution stage is static, it does not add complexity to the overall switching determination of a switching network. Thus, the distribution stage enables the switching network to be expanded without degrading the switching performance of the network.

32 Claims, 13 Drawing Sheets

DISTRIBUTION STAGE FOR ENABLING EFFICIENT EXPANSION OF A SWITCHING NETWORK

This application claims the benefit of U.S. provisional patent application Nos. 60/377,377, 60/377,374 and 60/377,375, each of which was filed on May 2, 2002 and each of which is hereby incorporated by reference in their entirety.

FIELD OF THE INVENTION

This invention relates generally to networking technology and more particularly to an expandable switching network.

BACKGROUND

Multi-stage Clos arrays are used regularly in the networking industry to switch information from input to output in a switching system. A block diagram of a typical three stage Clos array is shown in FIG. 1A, comprising a plurality (K) of ingress devices 102, a plurality (P) of center stage devices 104, and a plurality (K) of egress devices 106. In a Clos array, each device (i.e. ingress, center stage, and egress) is capable of connecting any of its inputs to any of its outputs without restriction. In this example the plurality of ingress devices 102 and the plurality of egress devices 106 are equal in number. However, this equal number of egress and ingress devices is not needed.

To qualify as a Clos array, a three stage switching array has to meet at least two main requirements. A first requirement is that each ingress device 102 must have at least one logical link to each center stage device 104, and each egress device 106 must have at least one logical link to each center stage device 104. By logical link, it is meant that an information path exists between two devices so that the two devices can send/receive communications to/from each other. This requirement of the Clos array ensures that information from any ingress device 102 can be switched to any egress device 106 through any center stage device 104. Hereinafter, the term "logical link" will be used to refer to a logical link as defined above, and the term "link" will be used to refer to a physical link (or line), such as an electrical or optical fiber line. Note that a physical link need not be equivalent to a logical link. For example, a physical link may comprise a plurality of logical links and a plurality of physical links may comprise a logical link.

A second requirement of a Clos array is that the logical links need to be symmetrical. That is, the amount of bandwidth on each logical link needs to be the same. If these requirements are satisfied, then a three stage switching array can qualify as a Clos array.

In the array of FIG. 1A, each ingress device 102 has a link to each center stage device 104. Likewise, each egress device 106 has a link to each center stage device 104. Because there are a K number of ingress devices 102 and a K number of egress devices 106, and because each device 102, 106 has a link to each center stage device 104, it means that each center stage device 104 has a K number of input ports for receiving the links from the ingress devices 102, and a K number of output ports for coupling to the egress devices 106. Thus, each center stage device 104 is said to have a K number of input/output ports.

As shown in FIG. 1A, each link between a center stage device 104 and an ingress 102 or egress 106 device carries an N number of time slots or bandwidth units (BU's) (a BU may be viewed as a unit of information that is carried on a link). Since each center stage device 104 has K input/output ports, and each port handles N BU's, the total amount of BU's handled by each center stage device 104 is K*N.

When it comes to implementing switching arrays that support a large number of inputs and outputs, the configuration of FIG. 1A is limited. This limitation is due to the fact that the total capacity of the switching array can only be increased by either using larger ingress and egress devices 102 and 106 or using a larger number of ingress and egress devices and hence a larger center stage device 104.

To elaborate, suppose that it is desired to implement a switching array comprising 72 ingress devices 102 and 72 egress devices 106, with each link carrying 18 BU's. To implement this switching array with the configuration of FIG. 1A, each center stage device 104 would have to have 72 input/output ports, and would need to be able to handle 1,296 BU's. Likewise, to implement a switching array with 144 ingress and egress devices, with each link carrying 18 BU's, each center stage device 104 would need to have 144 input/output ports, and would need to be able to handle 2,592 BUs. Due to practical cost and technological constraints, it may not be possible to implement large center stage devices 104. Even if it were, it would be clear that the size of the array would be limited by the capabilities of the center stage devices 104. At any given time with regard to such technology, a center stage device 104 will be able to have only so many input/output ports and process only so much overall BUs. As an alternative, one could simply increase the size of the ingress and egress devices but this simply moves the problem away from the center stage device to the ingress and egress devices. In either case the size of the array that can be achieved using the configuration of FIG. 1A will be limited by the current state of technology. Thus, as this discussion shows, the configuration of FIG. 1A has limits to scalability.

As an alternative to a three stage array, a five or more stage switching array may be implemented. A sample five-stage array 150 is shown in FIG. 1B, comprising a plurality (K) of ingress devices 102 and egress devices 106, a plurality (P) of center stage devices 104, and a plurality (L) of $2^{nd}$ stage devices 120 and $4^{th}$ stage devices 130. By increasing the number of switching stages, it is possible to grow the overall array without proportionately growing the number of input/output ports of each device 102, 104, 106 or the amount of BU's handled by each device 102, 104, 106. Thus, adding more switching stages makes the array more scalable.

There are significant drawbacks to this approach, however. For one thing, implementing additional switching stages significantly increases the number of switching devices that need to be implemented in the array, which in turn, significantly increases the cost of the overall array. Also, implementing more switching stages significantly increases the complexity and cost involved in controlling the switching in the overall array. As part of the switch array control, a control algorithm is run to determine what configuration of the switch array will realize the desired connection of array inputs to array outputs. This configuration needs to be loaded to each of the switch devices in the array. Increasing the number of switching stages adds complexity to both the control algorithm and to the method of distributing the configuration information to all the switching devices. For example, in array 150 of FIG. 1B each device is dynamically reconfigured to realize a given set of connections through the array. Because the $2^{nd}$ and $4^{th}$ stage device 120, 130 are dynamically reconfigurable, a switching algorithm needs to take the switching capabilities of these devices into account in determining how to switch information through the array 150. Factoring these devices 120, 130 into the switching determination significantly increases the complexity of the determination. This increases the amount of time needed to compute a switching scheme for the array, which in turn degrades the array's ability to make fast switching changes. In addition, this complicates methods for implementing a switching scheme for multi-cast functionality. Because of these and other drawbacks, the approach of adding more switching stages to expand a switching array is less desirable.

As the above discussion shows, the current approaches to implementing switching arrays do not enable the arrays to be efficiently expanded. As a result, an improved approach is needed.

SUMMARY

To overcome the shortcomings of the prior art, a mechanism is provided for enabling a switching network to be freely and efficiently expanded. In one embodiment, network expansion is achieved using inter-stage bandwidth distribution.

More specifically, a distribution stage is disposed between a first stage and a second stage of a switching network. The first stage comprises a plurality of first stage switching devices, and the second stage comprises a plurality of second stage switching devices. The first and second stages may be, for example, an ingress stage and a center stage, respectively. The first and second stages may also be a center stage and an egress stage, respectively. The distribution stage is coupled to both stages.

The distribution stage is configured to receive a plurality of bandwidth units (BU's) from each first stage switching device, and to distribute at least one BU from each first stage switching device to each second stage switching device, such that each second stage switching device is assured of receiving at least one BU from each first stage switching device. In effect, the distribution stage ensures that each first stage switching device has a logical link to each second stage switching device. By distributing the BU's in this manner, the distribution stage enables the BU load to be spread among more center stage devices. This in turn, enables the center stage and hence, the overall array, to be more freely expanded.

In one embodiment, the distribution stage is configured in accordance with a BU distribution configuration that is static. Because the distribution configuration of the distribution stage is static, it does not add significant complexity to the overall switching determination of the network. Thus, unlike the $2^{nd}$ and $4^{th}$ stages of the array of FIG. 1B, the distribution stage enables the switching network to be expanded without degrading the switching performance of the network. In addition, because the distribution configuration of the distribution stage is static, the distribution stage can be implemented in a three stage network without turning the network into a higher stage switching network (this is in sharp contrast to the $2^{nd}$ and $4^{th}$ stages of FIG. 1B). As a result, any switching algorithm that applies to three stage networks can still be used to control a three stage network in which the distribution stage is implemented. This allows a three stage switching network to be expanded while still taking advantage of the efficient switching algorithms that have been developed for three stage networks.

DETAILED DESCRIPTION OF EMBODIMENT(S)

Conceptual Overview

Figure 1A:
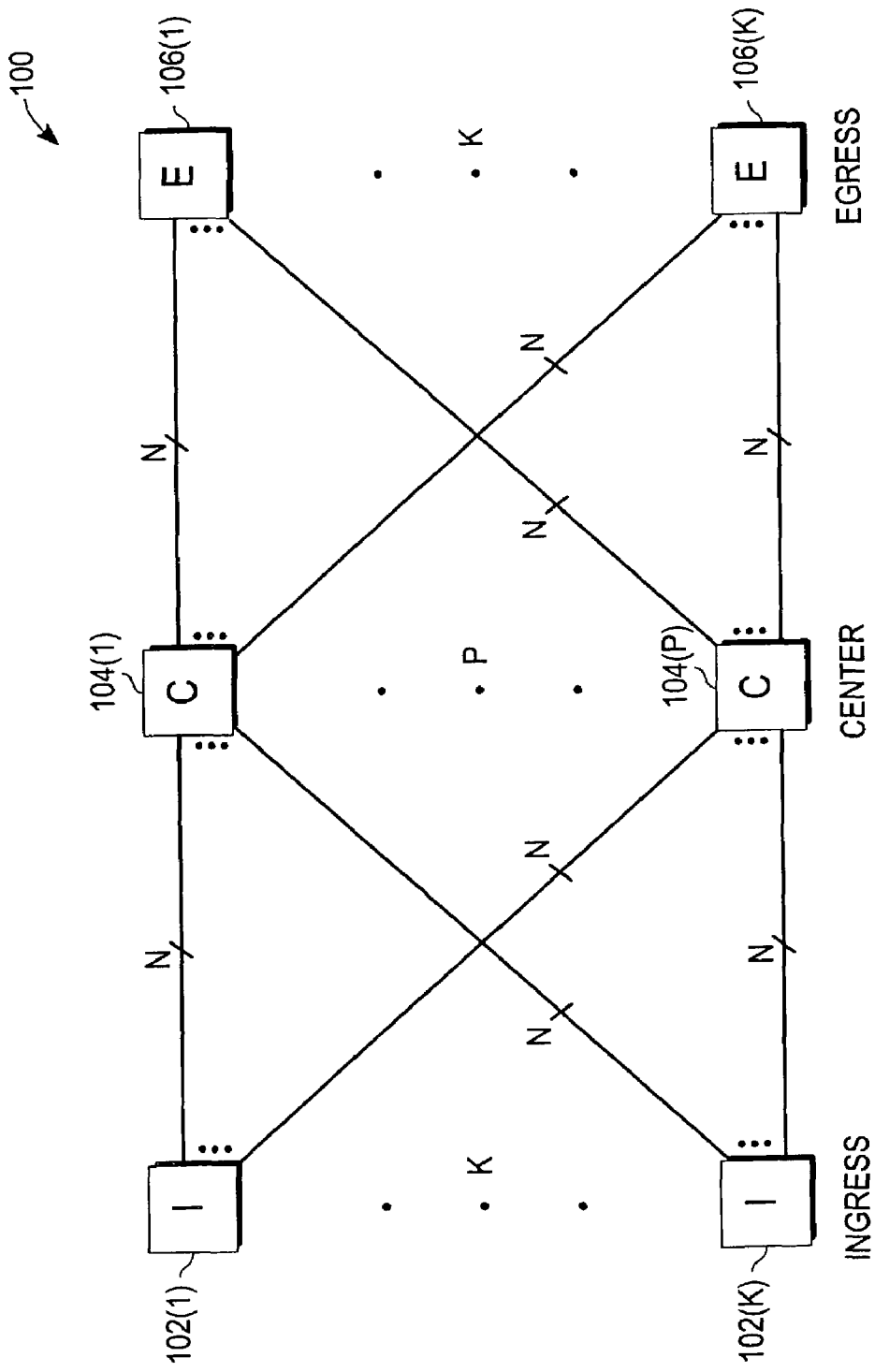
FIG. 1A is a functional diagram of a typical three stage Clos array.

In the typical three stage Clos array or network (the terms array and network are used synonymously herein) of FIG. 1A, each ingress device 102 has a link to each center stage device 104. For each link, all of the N number of BU's on that link are from one single ingress device 102. Because each ingress device 102 has a link to every center stage device 104, and because each link carries BU's from only one ingress device 102, each center stage device 104 has to have as many input ports as there are ingress devices 102. As discussed above, this aspect significantly limits the scalability of the configuration of FIG. 1A.

It is observed that the configuration of FIG. 1A imposes more constraints than are necessary to satisfy the requirements of a three stage Clos array. Specifically, while a three stage Clos array does require that each ingress device 102 have a logical link to each center stage device 104, it is not required that each center stage device 104 receive the full N number of BU's from each ingress device 102. If a center stage device 104 receives just a portion of the N BU's from an ingress device 102, the three stage Clos array requirement is still satisfied. It is further observed that a link to a center stage device 104 does not have to contain BU's from just one ingress device 102. Instead, a link to a center stage device 104 could contain BU's from a plurality of different ingress devices 102. If these observations are properly exploited, it is possible to implement a three stage Clos array that is more freely and efficiently expandable.

Figure 2:
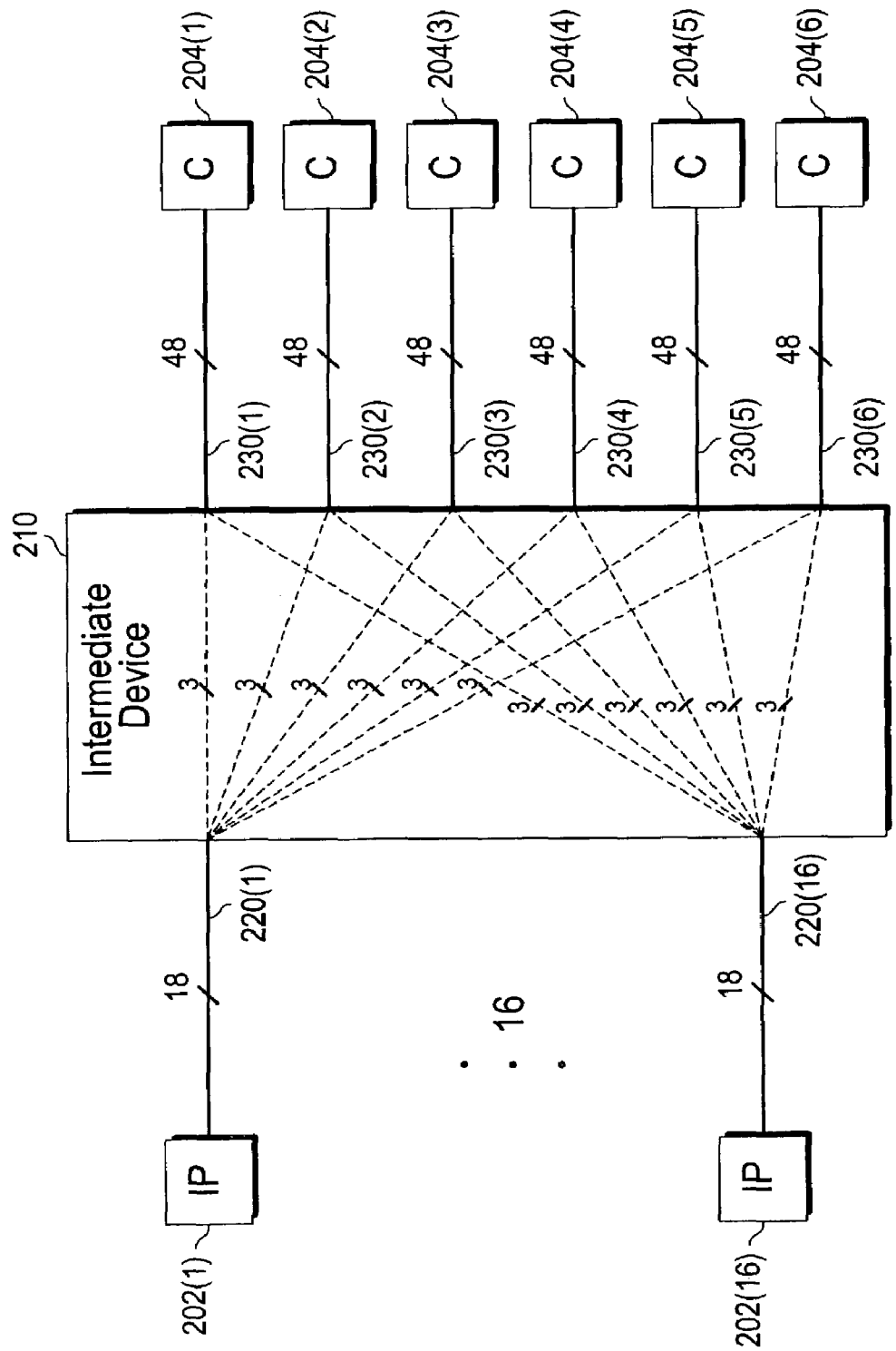
FIG. 2 is a functional diagram of a specific instance of an intermediate device illustrating the concept of BU distribution in accordance with one embodiment of the present invention.

To illustrate how these observations can be exploited, reference will be made to the example of FIG. 2. FIG. 2 shows an intermediate device 210 disposed between a set of ingress device ports (IP) 202 and a set of center stage devices 204. Each IP 202 is a port from an ingress device (not shown), and in one embodiment, each IP 202 is from a different ingress device. In this example, it is assumed for illustrative purposes that there are 16 IP's 202 and 6 center stage devices 204. It is also assumed that each ingress device link 220 (referred to herein as an "I link") carries 18 BU's. Because there are 16 IP's 202 and 6 center stage devices 204, the intermediate device 210 has 16 inputs (one for each I link 220) and 6 outputs (one for each center stage device 204).

At each input, the intermediate device 210 receives an I link 220 from an IP 202. The intermediate device 210 divides the BU's on that I link 220 into 6 equal portions, with each portion being destined for one of the 6 intermediate device outputs. In this example, each portion contains 3 BU's. The intermediate device 210 does this with each of its inputs, so that 3 BU's from each I link 220 are sent to each intermediate device output, as shown in FIG. 2.

At each intermediate device output, a portion of the BU's received from each of the intermediate device inputs is combined. Since each of the intermediate device outputs receives 3 BU's from each of the 16 intermediate device inputs, each intermediate device output has 48 BU's, 3 from each I link 220. Once an intermediate device output combines these 48 BU's, it sends the 48 BU's to a corresponding center stage device 204 via an ingress-to-center link 230 (referred to herein as an "IC link"). In this manner, BU's from the IP's 202 are conveyed to the center stage devices 204 via the intermediate device 210.

Several aspects of this configuration should be noted. First, note that it satisfies the logical link requirement of the three stage Clos array. That is, each IP 202 (and hence, each ingress device since each IP 202 is from a different ingress device) has a logical link to each center stage device 204. Each IP 202 sends just 3 rather than 18 BU's to each center stage device 204; nonetheless, the logical link requirement is satisfied.

Also, note that this configuration allows the total number of BU's to be spread out among a plurality of center stage devices 204, rather than being concentrated in one center stage device 204, as is the case with the configuration of FIG. 1A. By doing so, this configuration makes the number of center stage devices 204 more freely expandable. This will be elaborated upon in a later section.

In addition, note that this configuration significantly reduces the number of ports that each center stage device 204 has to have. As shown in FIG. 2, each center stage device 204 receives one IC link 230. This one link includes a logical link from each of the 16 IP's 202 (3 BU's from each). Thus, with just one physical link (and hence, one port), each center stage device 204 is able to establish a logical link with each of the 16 IP's 202. In contrast, the configuration of FIG. 1A would have required each of the center stage devices to have had 16 ports to achieve this same result. By putting a plurality of logical links onto a single physical link, the configuration of FIG. 2 makes it possible to reduce the number of links going to each center stage device 204, which in turn, reduces the number of ports that each center stage device 204 has to have.

Figure 1B:
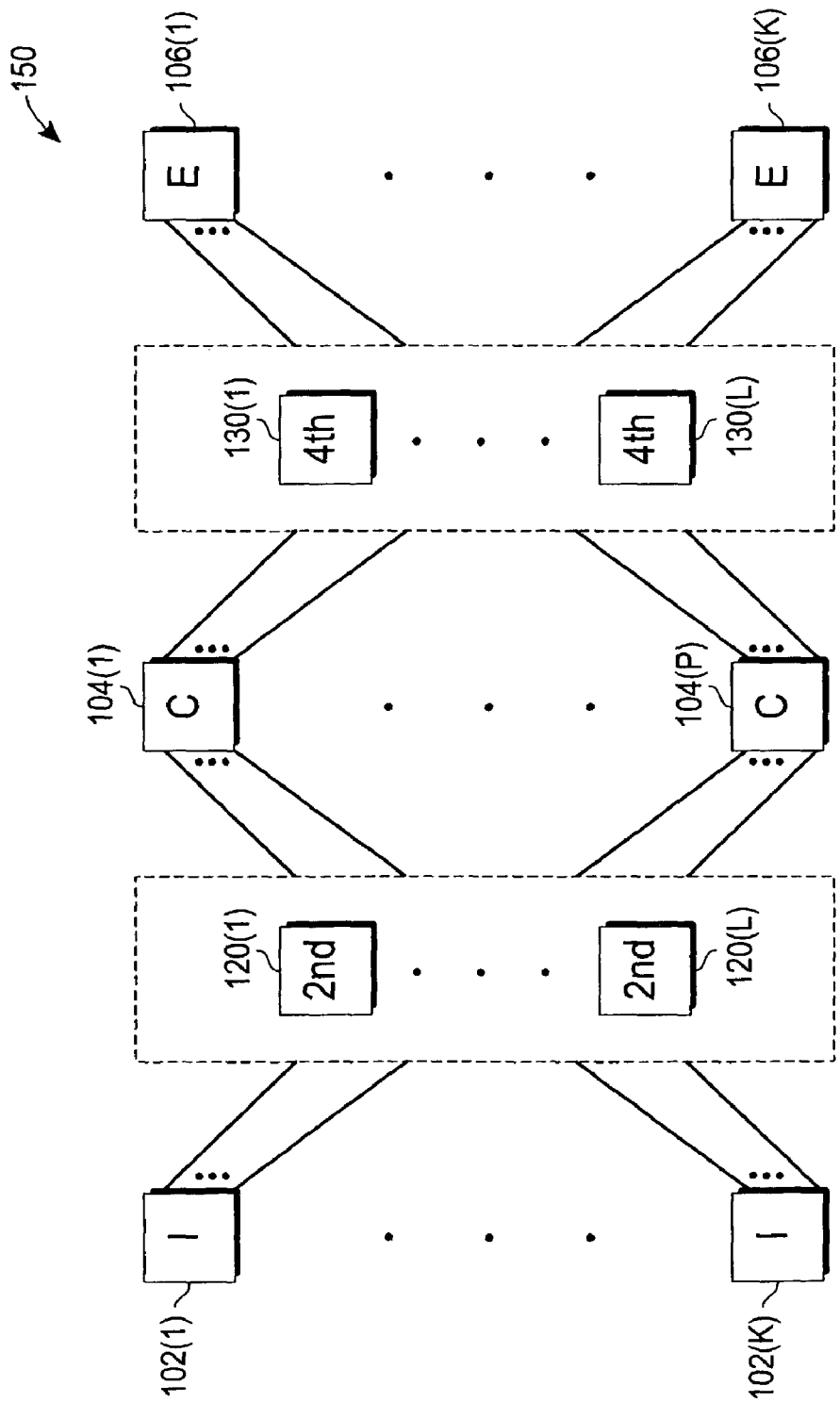
FIG. 1B is a functional diagram of a typical five-stage switching array.

Further, note that unlike the $2^{nd}$ stage device 120 and the $4^{th}$ stage device 130 of FIG. 1B, the intermediate device 210 need not be a dynamically configurable switching device. Instead, the BU distribution configuration of the intermediate device 210 may be static or fixed. By static, it is meant that once the input to output mapping of the intermediate device 210 is set, it does not change. For example, the intermediate device input that receives I link 220(1) distributes 3 BU's from that I link to each of the IC links 230. That distribution configuration is static and does not change. The same is true for the rest of the intermediate device's distribution configuration. Because the intermediate device 210 has a static configuration, adding it to a switching array does not increase the complexity of the switching determination for the array. In addition, because the distribution configuration is static, if the intermediate device 210 is implemented in a three stage array, switching in the array can still be controlled using any switching algorithm that applies to three stage arrays (i.e. the static configuration of the intermediate device 210 allows the array to remain a three stage array rather than become a higher stage array). Thus, intermediate device 210 makes it possible to expand a switching array without degrading the array's switching performance or increasing the array's switching complexity.

Yet another point to note is that intermediate device 210 is much less costly than a dynamically configurable switching device (such as the $2^{nd}$ stage devices 120 and the $4^{th}$ stage devices 130 of FIG. 1B). Thus, it can be implemented very cost effectively in a switching array.

Figure 3:
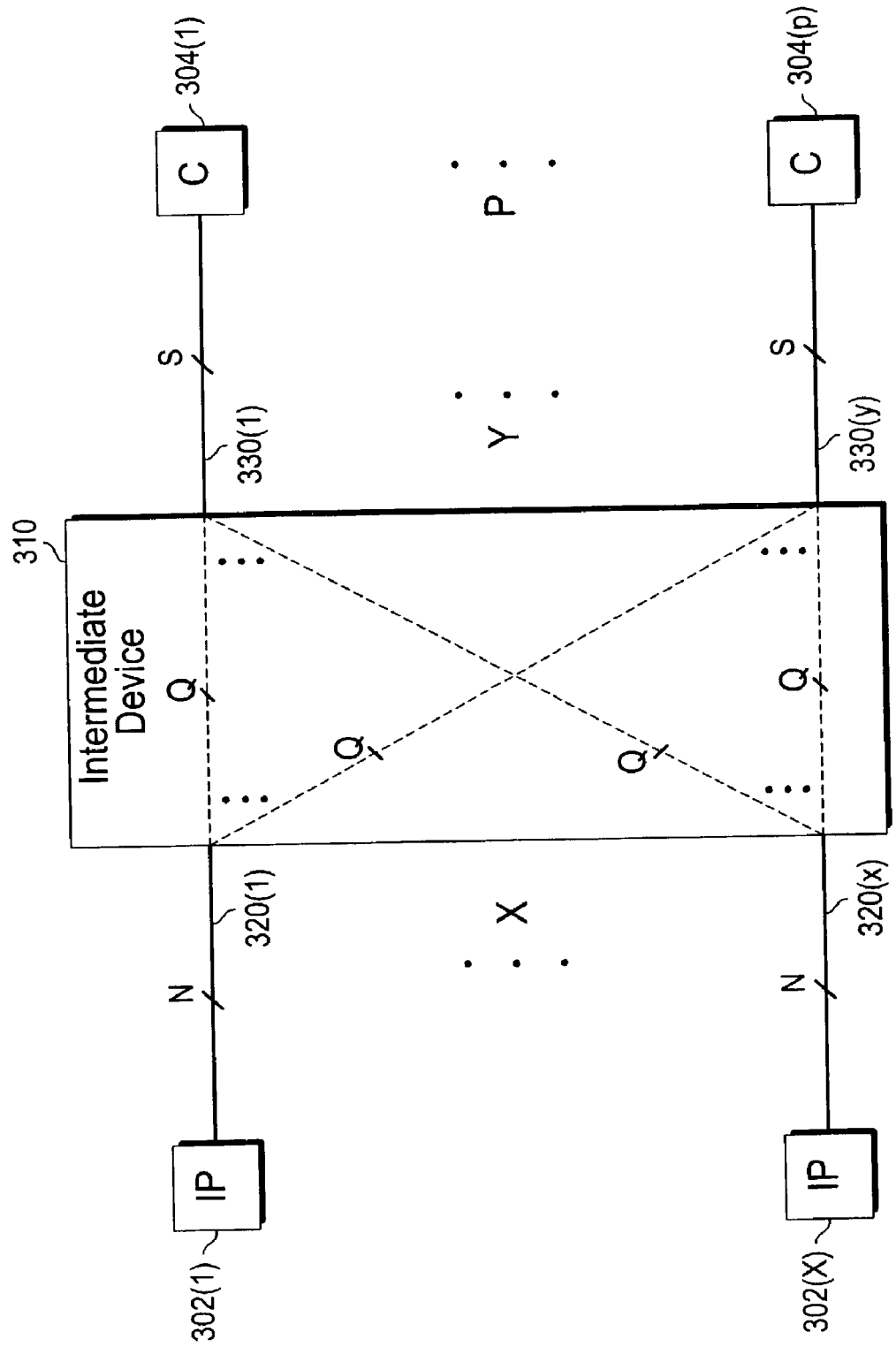
FIG. 3 is a general representation of an intermediate device that may be implemented between an ingress stage and a center stage in accordance with one embodiment of the present invention.

FIG. 2 shows a very specific example of how an intermediate device 210 may be used to exploit the observations made above. FIG. 3 shows a more general configuration. In FIG. 3, there are an X number of IP's 302, each providing one I link 320, each I link 320 carrying N BU's. Because there are X IP's 302, the intermediate device 310 has X inputs. The intermediate device 310 also has Y outputs. Each output carries an S number of BU's to a corresponding center stage device 304 via an IC link 330. There is an IC link 330 for each center stage device 304; thus, the number Y of intermediate device outputs is equal to P, the number of center stage devices 304. Q represents the number of BU's (referred to herein as the granularity) that are sent from each intermediate device input to each intermediate device output.

For this configuration, the following relationships hold:

(1) Y=N/Q (should be an integer);
(2) N*X=S*Y (the number of BU's into the intermediate device 310 should equal the number of BU's out of the intermediate device 310); and
(3) Y=P.

By properly selecting the various values, a viable and effective configuration can be derived.

Figure 4:
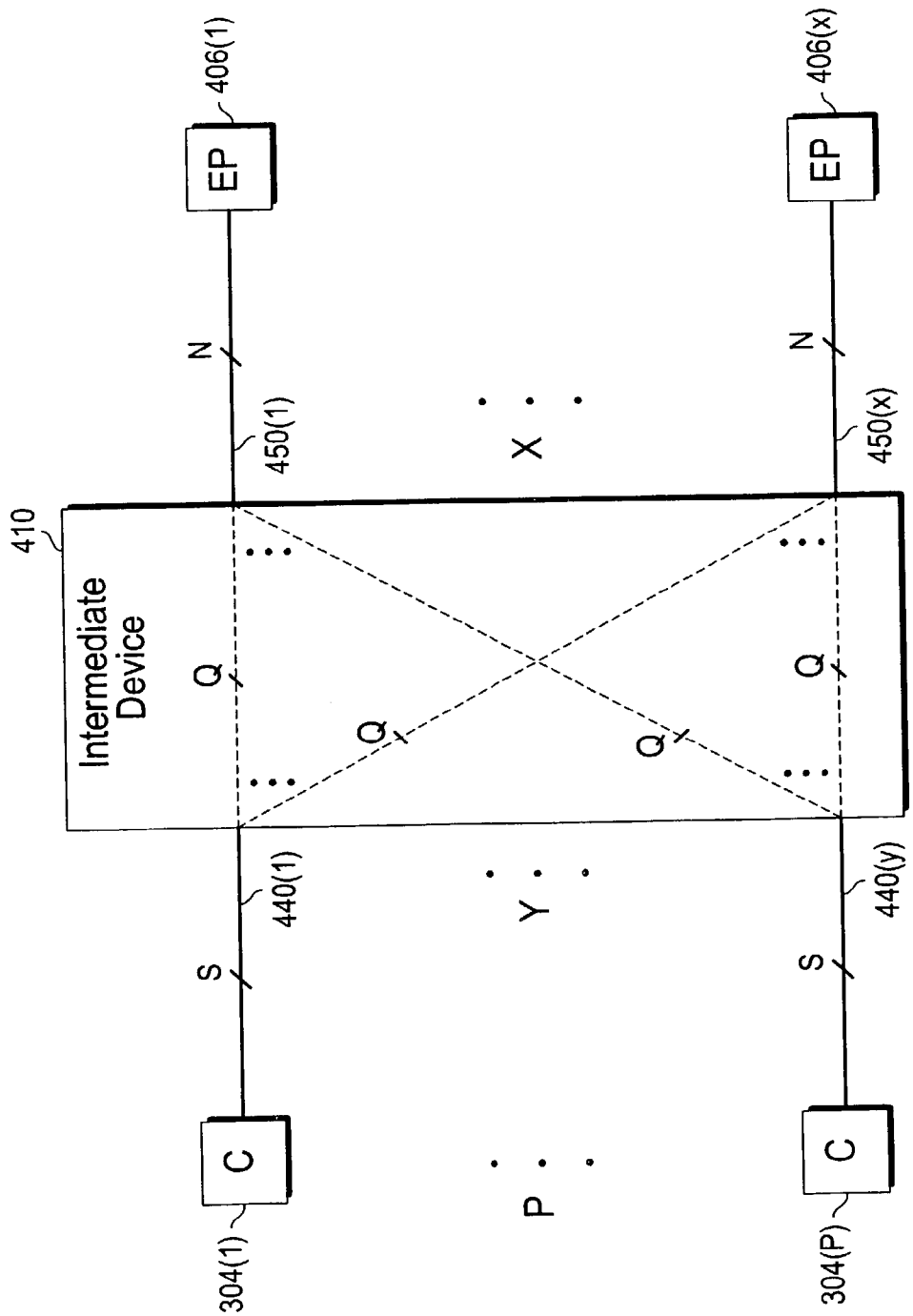
FIG. 4 is a general representation of an intermediate device that may be implemented between a center stage and an egress stage in accordance with one embodiment of the present invention.

Thus far, only the ingress-to-center-stage side of the array has been discussed. The same general concepts also apply to the center-stage-to-egress side of the array. This is shown in FIG. 4. Specifically, FIG. 4 shows an intermediate device 410 disposed between P center stage devices 304 and X egress device ports (EP's) 406 (in one embodiment, each EP 406 is from a different egress device (not shown)). The intermediate device 410 has a Y number of inputs, one for each of the center-to-egress links 440 (referred to hereafter as "CE links"). The intermediate device also has an X number of outputs, one for each of the EP's 406.

At each input, the intermediate device 410 receives an S number of BU's from one of the CE links 440. The intermediate device 410 divides these BU's, and sends a Q number of BU's to each of the intermediate device outputs. At each intermediate device output, the intermediate device 410 combines all of the BU's received from each of the intermediate device inputs to derive an N number of BU's, and sends the N BU's to a corresponding EP 406 via an egress link 450 (referred to hereafter as an "E link"). In this manner, BU's from the center stage devices 304 are conveyed to the EP's 406 via the intermediate device 410.

For this configuration, the same relationships as those provided above hold. That is:

(1) Y=N/Q (should be an integer);
(2) N*X=S*Y (the number of BU's into the intermediate device 410 should equal the number of BU's out of the intermediate device 410); and
(3) Y=P.

Thus, the above concepts may be applied to the center-stage-to-egress side of a switching array as well.

Figure 5:
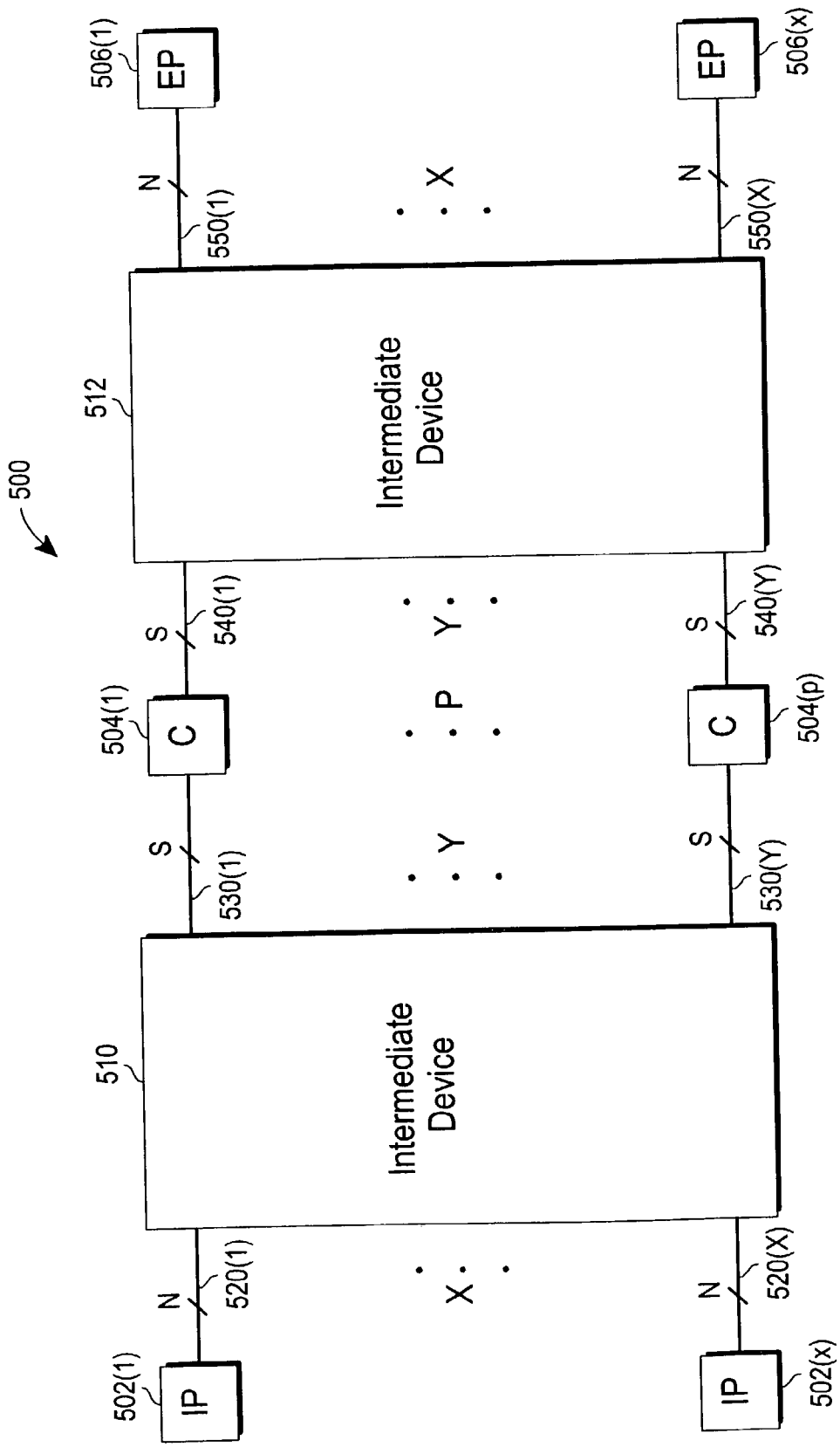
FIG. 5 is a functional diagram of an array portion that can be derived by combining the concepts shown in FIGS. 3 and 4.

By combining the components of FIGS. 3 and 4, a portion 500 of a three stage Clos array can be derived, as shown in FIG. 5. Portion 500 comprises a plurality (X) of IP's 502 and EP's 506, a plurality (P) of center stage devices 504, an ingress intermediate device 510, and an egress intermediate device 512. The ingress intermediate device 510 of portion 500 takes the form of the intermediate device 310 shown in FIG. 3, and the egress intermediate device 512 takes the form of the intermediate device 410 shown in FIG. 4. Because of the static configuration of the intermediate devices 510, 512, this portion 500 may operate as the center stage of a three stage Clos array, despite the presence of the intermediate devices 510, 512. Thus, its switching behavior can be controlled using any algorithm that can be used for three stage Clos arrays. Portion 500 can be replicated multiple times to derive a large-scale switching array, as will be described below.

Application of Concepts to Large Scale Switching Arrays

Figure 6:
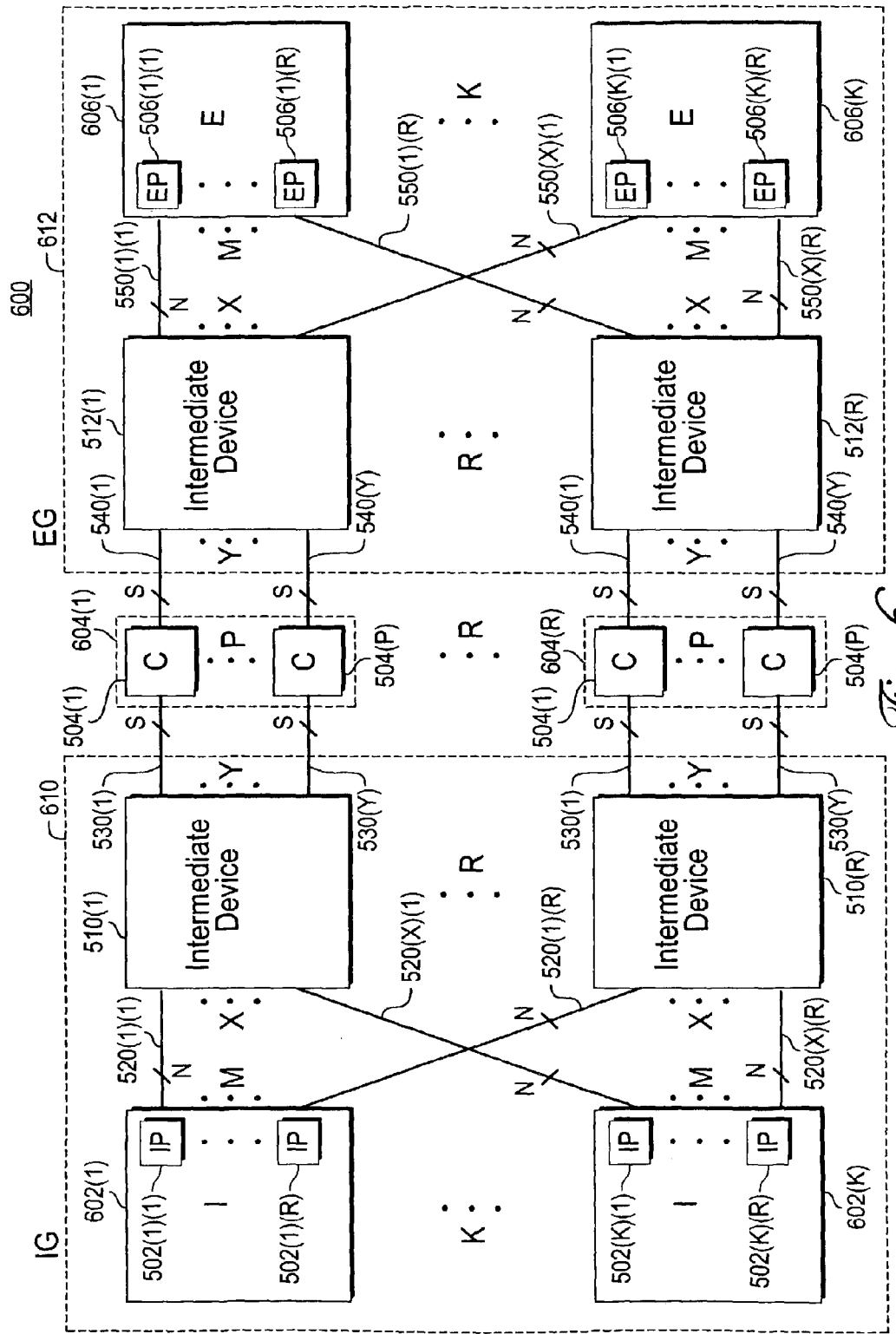
FIG. 6 is a functional diagram of a small-scale array in which the array portion of FIG. 5 is replicated multiple times.

With reference to FIG. 6, there is shown a functional block diagram of a small-scale switching array 600 in which portion 500 has been replicated an R number of times. Specifically, array 600 comprises R ingress intermediate devices 510, R egress intermediate devices 512, and R groups 604 of center stage devices 504, with each group 604 comprising P center stage devices 504. Array 600 further comprises K ingress devices 602 and K egress devices 606. Each ingress intermediate device 510 is coupled to an IP 502 of each ingress device 602 via an I link 520. Likewise, each egress intermediate device 512 is coupled to an EP 506 of each egress device 606 via an E link 550. These links, together with the BU distribution performed by each intermediate device 510, 512, ensure that each ingress device 602 and each egress device 606 has a logical link to each center stage device 504.

For example, ingress device 602(1) is coupled to ingress intermediate device 510(1) via IP 502(1)(1) and I link 520(1)(1). Ingress intermediate device 510(1) distributes the N BU's on this I link to each of the center stage devices 504 in group 604(1). As a result, ingress device 602(1) has a logical link to each of the center stage devices 504 in group 604(1). Ingress device 602(1) is also coupled to ingress intermediate device 510(R) via IP 502(1)(R) and I link 520(1)(R). Ingress intermediate device 510(R) distributes the N BU's on this I link to each of the center stage devices 504 in group 604(R). As a result, ingress device 602(1) also has a logical link to each of the center stage devices 504 in group 604(R). In one embodiment, ingress device 602(1) is coupled to all of the ingress intermediate devices 510 via a corresponding I link; thus, ingress device 602(1) has a logical link to each and every center stage device 504. Overall, each ingress device 602 has an I link to each of the ingress intermediate devices 510. Likewise, each egress device 606 has an E link to each of the egress intermediate devices 512. Thus, every ingress device 602 and every egress device 606 has a logical link to every center stage device 504. As a result, the logical link requirement of the three stage Clos array is satisfied.

Also, as described previously, each logical link comprises a Q number of BU's. Because the number of BU's on each logical link is uniform, the symmetrical requirement of the three stage Clos array is also satisfied. Consequently, array 600 qualifies as a three stage Clos array.

As shown in FIG. 6, each ingress device 602 and each egress device 606 has an M number of input/output ports that connect to the intermediate devices. Since each ingress device 602 has an I link 520 to each ingress intermediate device 510, and since there are R ingress intermediate devices 510, M=R in this example (note: if so desired, it is possible to have multiple links between an ingress device 602 and an intermediate device 510). This same relationship holds for the egress side. Also, each ingress intermediate device 510 has an X number of I links 520. Since each ingress intermediate device 510 has an I link 520 to each ingress device 602, and since there are K ingress devices 602, X=K. This same relationship holds for the egress intermediate devices 512 and the egress devices 606. In addition, since there are R groups 604 of center stage devices, and since each group comprises P center stage devices 504, there are an R*P number of center stage devices 504 in the array.

Figure 7:
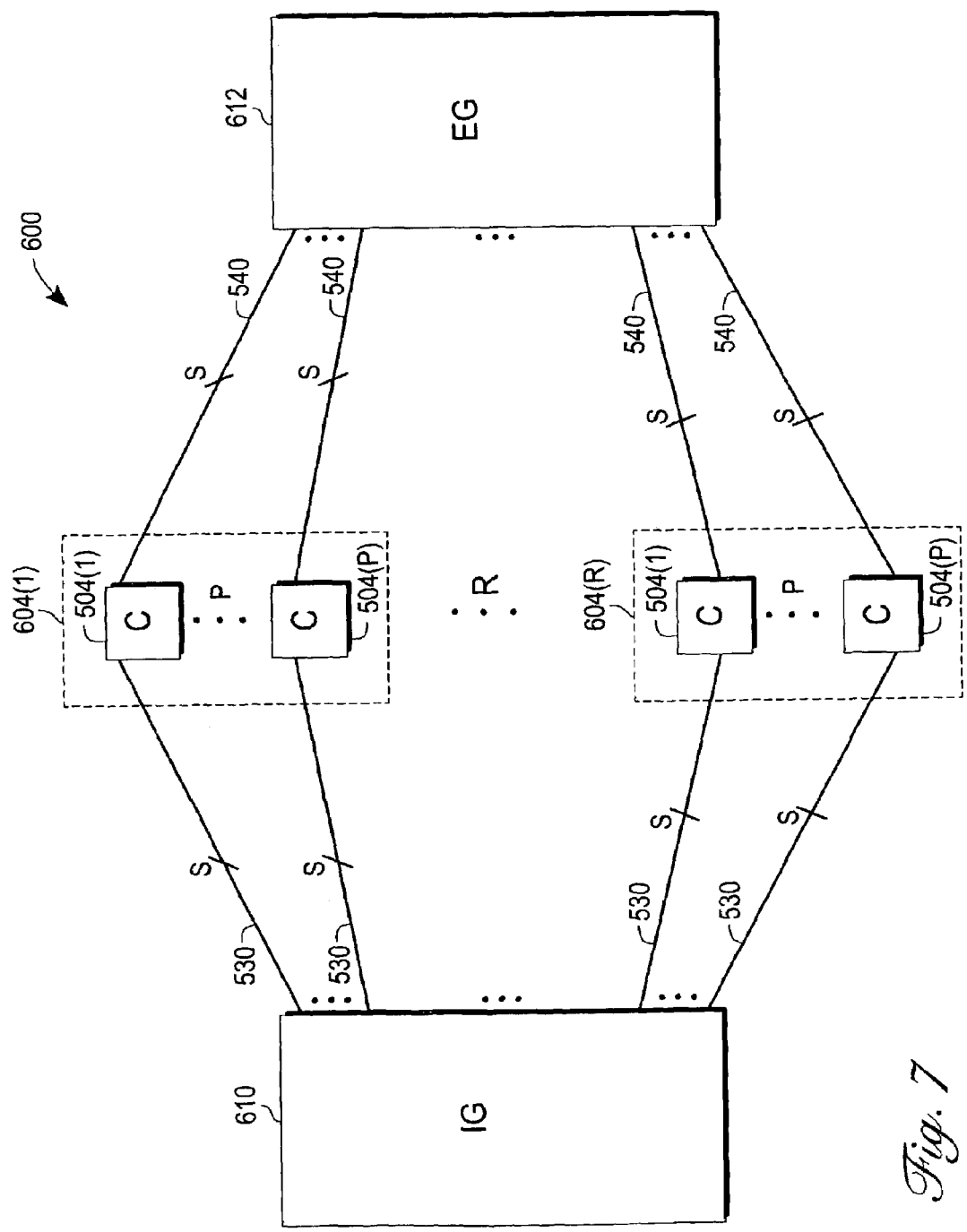
FIG. 7 is a simplified functional diagram of the array of FIG. 6, in which ingress devices and ingress intermediate devices have been grouped together, and in which egress devices and egress intermediate devices have been grouped together.

The configuration shown in FIG. 6 depicts a small-scale array. The configuration can be further expanded to derive an even larger array. To illustrate, all of the ingress devices 602 and all of the ingress intermediate devices 510 can be grouped together as a single ingress group (IG) 610 as shown in FIG. 6. Similarly, all of the egress devices 606 and all of the egress intermediate devices 512 can be grouped together as a single egress group (EG) 612 as shown. With this grouping, FIG. 6 can be simplified to the configuration shown in FIG. 7. Notice from FIG. 7 that each center stage device 504 has only one IC link 530 and one CE link 540, each carrying an S number of BU's. Most center stage devices 504 can have many more input/output ports, and can handle much more BU capacity than that. Therefore, additional IG's 610 and EG's 612 may be coupled to the center stage devices 504 to further expand the array.

Figure 8:
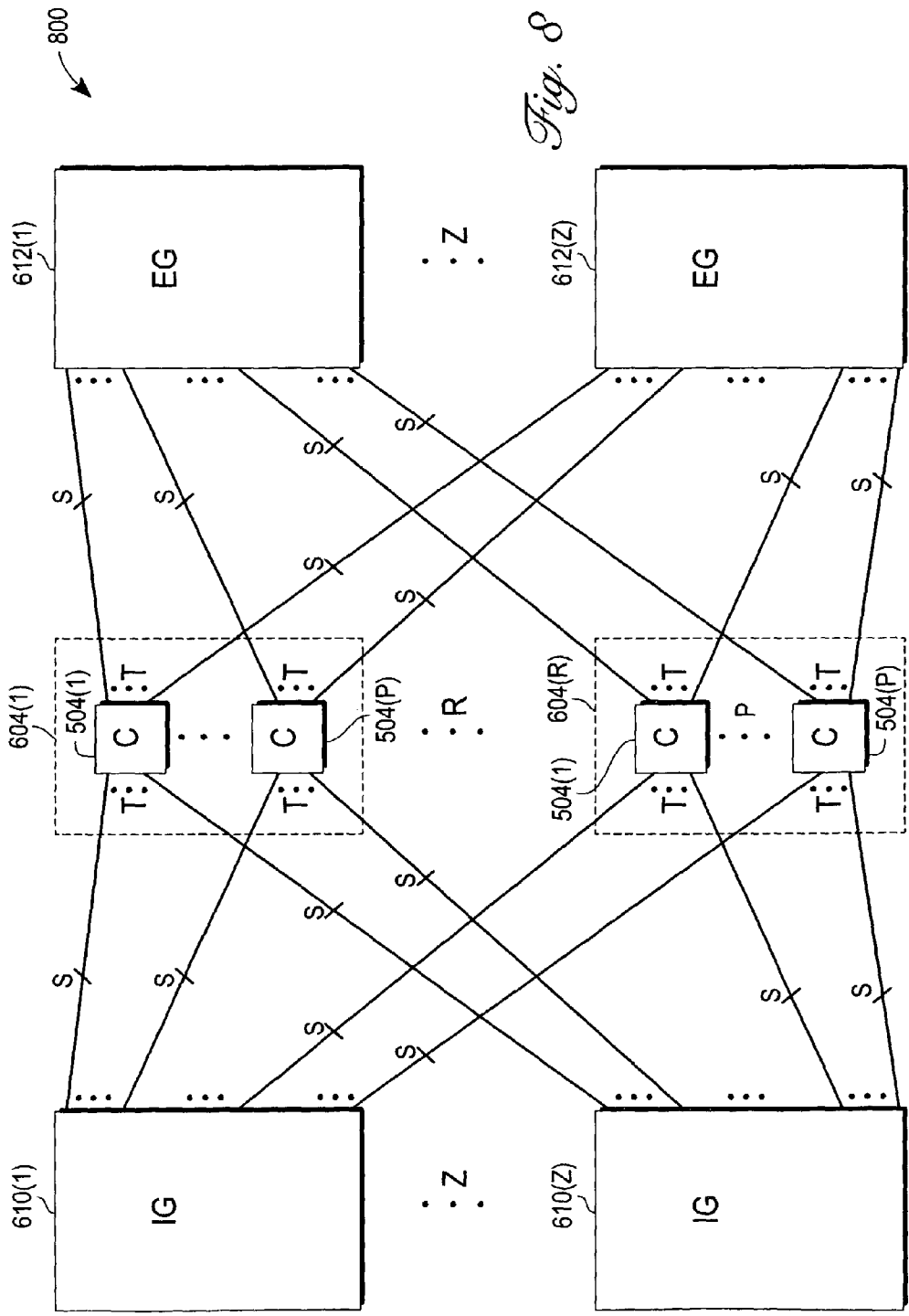
FIG. 8 is a functional diagram illustrating how the array of FIG. 7 can be further expanded to form a large-scale array.

This is shown in FIG. 8, where a Z number of IG's 610 and a Z number of EG's 612 are coupled to the center stage devices 504 to form a large-scale array 800. In one embodiment, the number T of input/output ports that each center stage device 504 has is equal to the number Z of IG's 610 and EG's 612 in the array. Since there are a Z number of IG's 610 and EG's 612, and since each IG 610 and EG 612 has a K number of ingress devices 602 and egress devices 606, respectively, array 800 can accommodate a Z*K number of ingress/egress devices 602, 606. The number of BU's handled by each center stage device 504 is equal to T*S.

In array 800, it should be noted that every ingress device 602 within the IG's 610 still has a logical link to every center stage device 504, and every egress device 606 within the EG's 612 still has a logical link to every center stage device 504. In addition, the logical links are symmetrical. As a result, even though it has been greatly expanded, the array 800 of FIG. 8 still qualifies as a three stage Clos array. Consequently, array 800 can take advantage of all of the special properties, algorithms, and advancements that apply to three stage Clos arrays.

Figure 9:
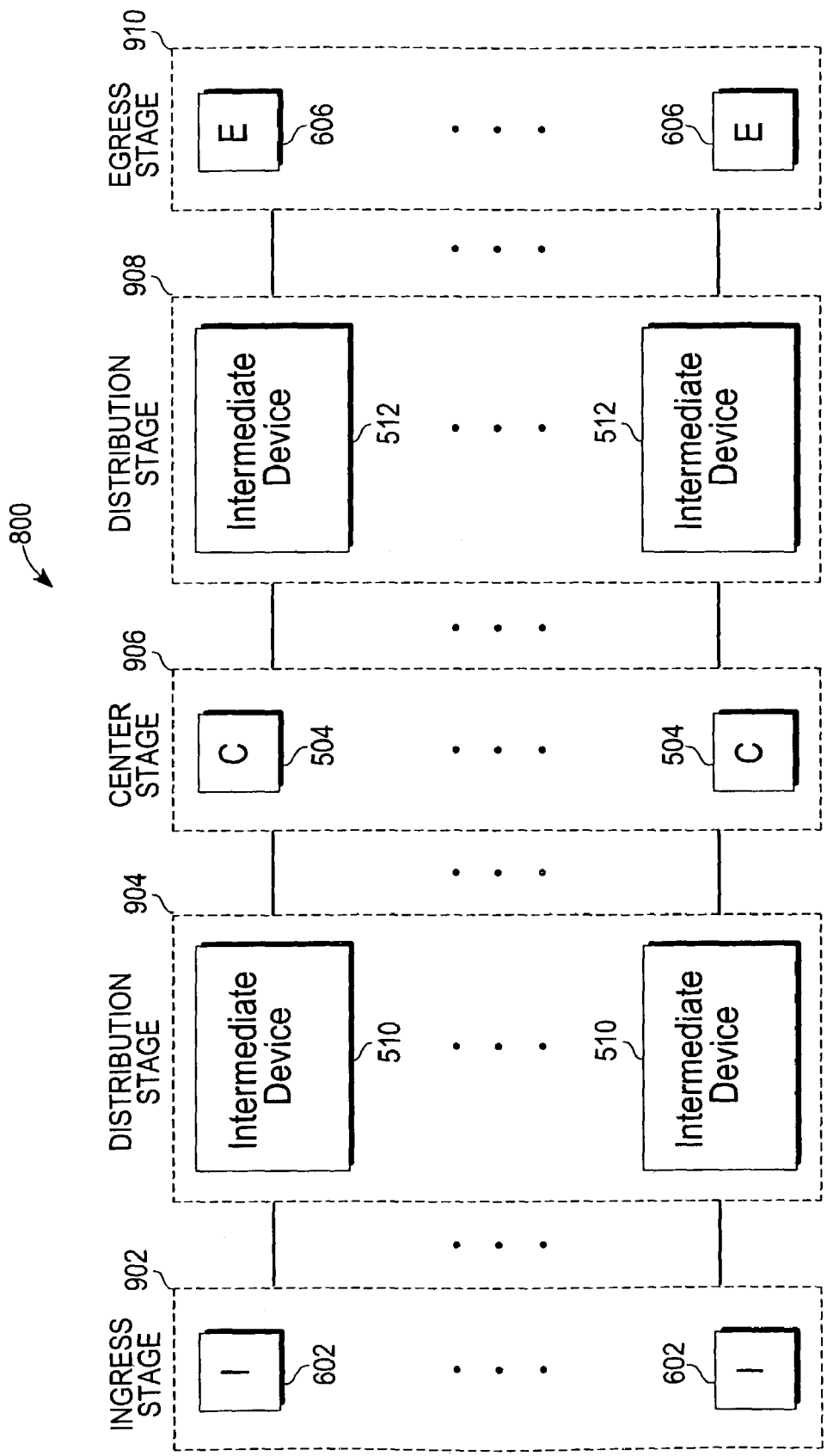
FIG. 9 is a functional representation of the array of FIG. 8.

From a high-level, conceptual standpoint, array 800 can be represented as shown in FIG. 9, wherein the array 800 comprises: (1) an ingress stage 902 comprising a plurality of ingress devices 602; (2) an ingress distribution stage 904 comprising a plurality of intermediate devices 510; (3) a center stage 906 comprising a plurality of center stage devices 504; (4) an egress distribution stage 908 comprising a plurality of intermediate devices 512; and (5) an egress stage 910 comprising a plurality of egress devices 606. Functionally, ingress distribution stage 904 receives a plurality of bandwidth units (BU's) from each ingress device 602, and distributes at least one BU from each ingress device 602 to each center stage device 504, such that each center stage device 504 is assured of receiving at least one BU from each ingress device 602. Similarly, the egress distribution stage 908 receives a plurality of bandwidth units (BU's) from each center device 504, and distributes at least one BU from each center stage device 504 to each egress device 606, such that each egress device 606 is assured of receiving at least one BU from each center stage device 504. In effect, the ingress distribution stage 904 and the egress distribution stage 908 ensure that each ingress device 602 and each egress device 606 has a logical link to each center stage device 504. In addition, in one embodiment, the distribution stages 904, 908 ensure that each logical link has the same number of BU's. This is the same result as that achieved by the array 800 of FIG. 8. Thus, FIG. 9 can be considered a functional representation of the array 800 of FIG. 8.

Sample Array

To give the teachings and the relationships provided above some meaning, a sample array will now be described. Suppose that it is desirable to implement a switching array with 72 ingress/egress devices 602, 606, with each ingress/egress device having 12 input/output ports (i.e. M=12). Suppose further that the array is to be implemented using center stage devices 504 with 12 input/output ports (i.e. T=12). In addition, suppose that the desired granularity Q is 2, and the number N of BU's on each I or E link is 18. For such an array: Y=P=9; X=K=6; S=12; Z=12; and R=12. Since the total number of center stage devices 504 is equal to R*P, this array has 12*9 or 108 center stage devices 504. Since the number of BU's handled by each center stage device 504 is equal to T*S, each center stage device 504 in this array handles 12*12 or 144 BU's. Thus, in this sample array, a 72 ingress/egress device array is achieved using relatively small center stage devices 504 (12 port devices, each handling just 144 BU's). This is in sharp contrast to the configuration of FIG. 1A, which would have required each center stage device to have 72 input/output ports, and to handle 1,296 BU's. As this example shows, use of the distribution stages 904, 908 makes it possible to spread the BU's over more center stage devices 504 and to reduce the number of ports that each center stage device 504 has to have. This makes the overall array much more expandable. As explained above, this expansion is achieved without significantly increasing the switching complexity of the array and without requiring more than three logical stages. Thus, the concepts taught herein make it possible to freely and efficiently expand the size of switching arrays without incurring the drawbacks of the prior art.

Application to Other Switching Arrays

Thus far, the implementation of the distribution stages has been described in the context of a three stage Clos array. It should be noted though that, if so desired, the distribution stages may also be implemented in other arrays (e.g. five-stage, seven-stage, etc.). For example, in the five-stage array of FIG. 1B, a distribution stage may be implemented in any or all of the following locations to expand the array: (1) between the ingress devices 102 and the $2^{nd}$ stage devices 120; (2) between the $2^{nd}$ stage devices 120 and the center stage devices 104; (3) between the center stage devices 104 and the $4^{th}$ stage devices 130; and (4) between the $4^{th}$ stage devices 130 and the egress devices 106. Distribution stages may likewise be implemented between any two stages in an array with a higher number of stages.

It should also be noted that the distribution stages may be implemented in arrays other than switching arrays. Generally, the distribution stages may be implemented in any system in which BU distribution may be used advantageously to facilitate the expansion of the system. All such implementations are within the scope of the present invention.

Intermediate Device Embodiment(s)

Figure 10:
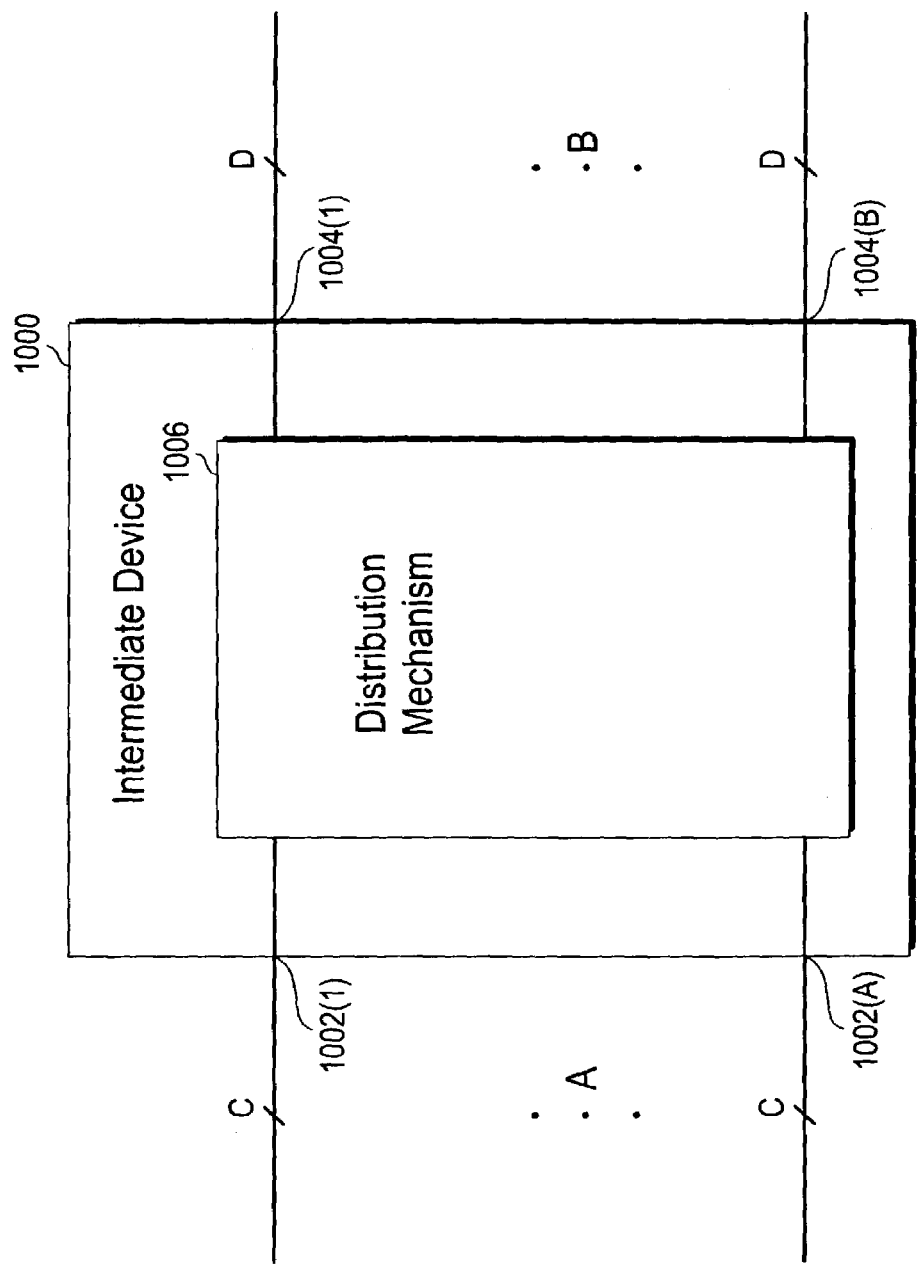
FIG. 10 is a functional diagram of an intermediate device in accordance with one embodiment of the present invention.
Figure 11:
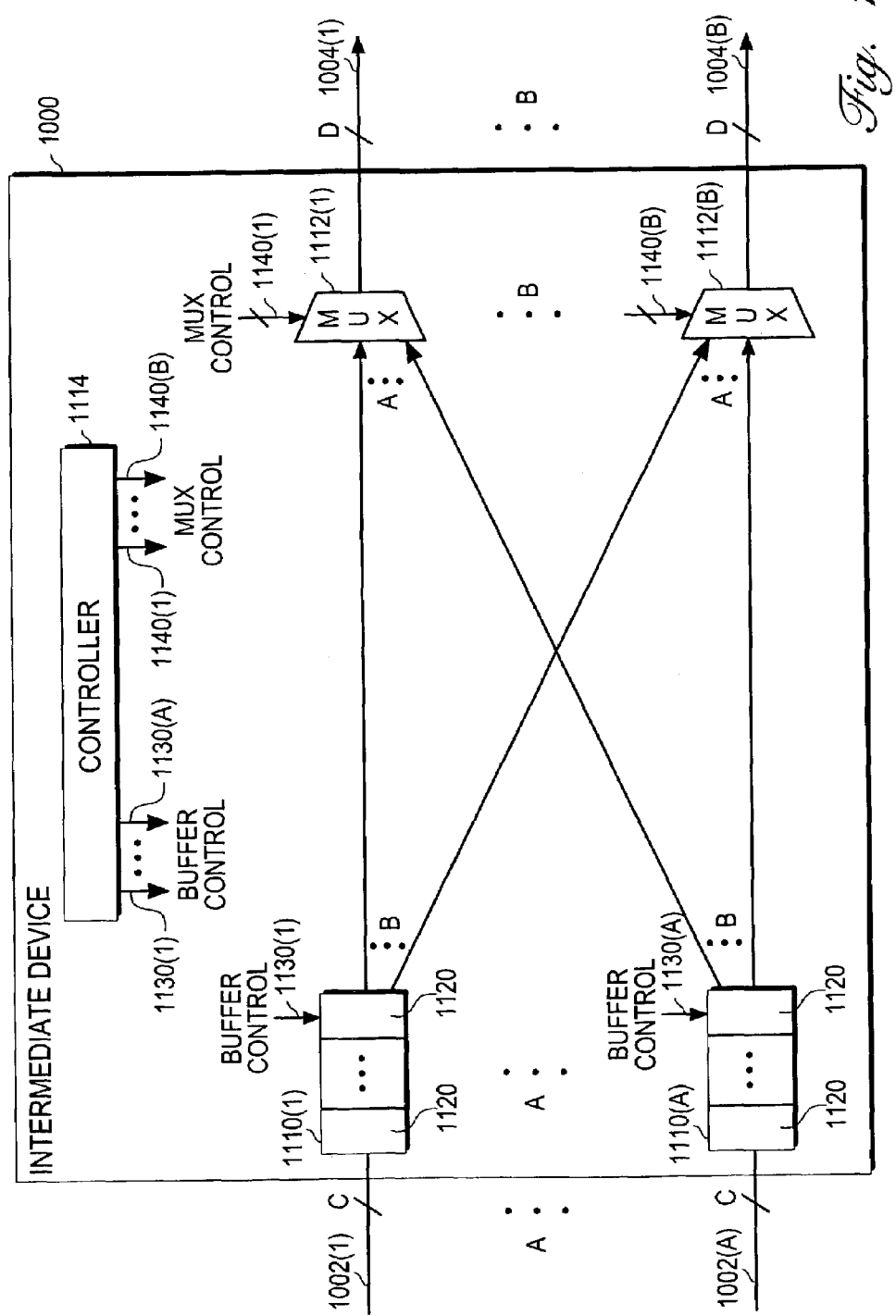
FIG. 11 is a more detailed depiction of one embodiment of the intermediate device of FIG. 10.

Thus far, the intermediate device has been described in functional terms. With reference to FIGS. 10 and 11, one possible embodiment of the intermediate device will now be described. This embodiment may be used to implement both the ingress intermediate devices 510 and the egress intermediate devices 520 of FIG. 5.

As shown in FIG. 10, the intermediate device 1000 comprises an A number of inputs 1002 and a B number of outputs 1004. Each input 1002 receives a C number of BU's from a corresponding input link, and each output 1004 delivers a D number of BU's onto a corresponding output link. The intermediate device 1000 further comprises a distribution mechanism 1006, which is coupled to each of the inputs 1002 and each of the outputs 1004. The distribution mechanism 1006 receives BU's from each of the inputs 1002 and distributes at least one BU from each input 1002 to each output 1004, such that each output 1004 is assured of receiving at least one BU from each input 1002. In one embodiment, the distribution mechanism 1006 distributes a Q number of BU's from each input 1002 to each output 1004.

The distribution mechanism 1006 distributes BU's in accordance with a BU distribution configuration. In one embodiment, this configuration is static or fixed. By static, it is meant that the input to output mapping of the intermediate device 1000 is not dynamically configurable. Once established, the mapping does not change (in fact, the mapping may be fixed by design). Thus, if the BU distribution configuration is established such that each output 1004 receives Q BU's from each input 1002, that configuration remains the same throughout normal operation of the intermediate device 1000. This static nature of the BU distribution configuration helps to ensure that each output 1004 receives at least one BU from each input 1002.

For this embodiment, the following relationships hold:
(1) B=C/Q (should be an integer); and
(2) A*C=B*D (the number of BU's into the intermediate device should equal the number of BU's out of the intermediate device).

The intermediate device 1000 is shown in greater detail in FIG. 11. As shown, the distribution mechanism 1006, in one embodiment, comprises a plurality of buffers 1110, a plurality of combiners 1112, and a controller 1114 for controlling the operation of the buffers 1110 and the combiners 1112. In one embodiment: (1) there is a buffer 1110 coupled to each input 1002; (2) each buffer 1110 comprises a plurality of storage portions 1120 for storing information received on the corresponding input 1002; (3) each storage portion 1120 stores information corresponding to one BU; (4) the buffers 1110 are implemented as FIFO's (first-in-first-out); (5) outputting of data from each buffer 1110 is controlled by a buffer control signal 1130 from the controller 1114; and (6) each buffer 1110 receives a separate buffer control signal 1130.

The output of each of the buffers 1110 is coupled to an input of each of the combiners 1112. In one embodiment: (1) there is a combiner 1112 for each output 1004, where the output of the combiner 1112 acts as the output 1004 of the intermediate device 1000; (2) each combiner 1112 is coupled to receive the output of each buffer 1110; (3) the combiners 1112 are implemented as multiplexers; (4) operation of each combiner 1112 is controlled by a set of mux control signals 1140 from the controller 1114; and (5) each combiner 1112 receives a separate set of mux control signals 1140. From a functional standpoint, each combiner 1112 receives Q BU's from each of the buffers 1110, combines the BU's into an output stream, and outputs the output stream onto a corresponding intermediate device output 1004.

The operation of the buffers 1110 and the combiners 1112 is controlled by the controller 1114. In controlling the buffers 1110 and combiners 1112, the controller 1114 produces a set of buffer control signals 1130 (one buffer control signal 1130 for each buffer 1110), and a set of mux control signals 1140 (one set of mux control signals 1140 for each combiner 1112). These control signals 1130, 1140 coordinate the operation of the various components to enable information from the proper buffer 1110 to be received and outputted by the proper combiner 1112. In one embodiment, the controller 1114 is implemented as a sequencer using hardwired logic components.

In operation, the controller 1114 coordinates operation of the buffers 1110 and combiners 1112 by issuing pairs of control signals. To illustrate how this is done, reference will be made to an example. Suppose controller 1114 wishes to have combiner 1112(1) receive and output a set of information from buffer 1110(1). To achieve this, the controller 1114 asserts the buffer control signal 1130(1) to cause the buffer 1110(1) to output a set of information. In addition, the controller 1114 sets the mux control signals 1140(1) to the proper logic levels to cause combiner 1112(1) to receive the information from buffer 1110(1) and to output it onto its output. By properly manipulating a pair of control signals in this manner, the controller 1114 can cause any combiner 1112 to receive and to output information from any buffer 1110. In one embodiment, the controller 1114 controls the buffers 1110 and combiners 1112 in such a way that each combiner 1112 receives and outputs a Q number of BU's from each buffer 1110.

As mentioned previously, the intermediate device 1000 is not a dynamically configurable switching device. While this is true, it should be noted that if so desired, a dynamically configurable switching device may be used to implement the function of the intermediate device 1000 if so desired. More specifically, if a dynamically configurable switching device is configured such that it is no longer dynamically configured, but rather implements the static BU distribution configuration described above for the intermediate device 1000, the dynamically configurable switching device may be used to implement the intermediate device 1000. This and other implementations of the intermediate device 1000 are within the scope of the present invention.

Multiple Stages of Intermediate Devices

Figure 12:
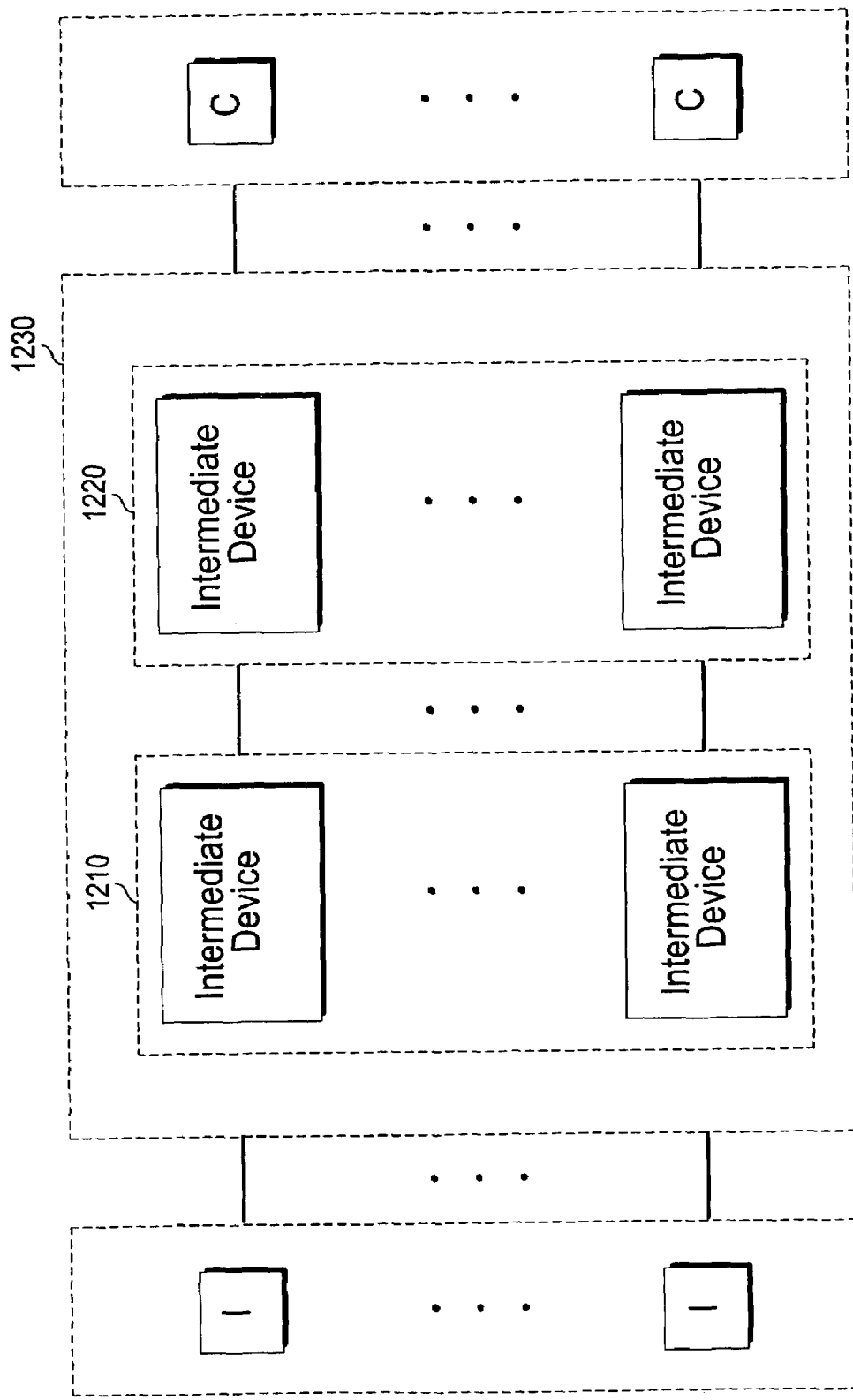
FIG. 12 is a functional diagram illustrating how an intermediate device stage may be implemented using multiple intermediate device stages coupled in series, in accordance with one embodiment of the present invention.

Thus far, the intermediate devices have been shown as being implemented in single stages. That is, a single stage of intermediate devices 510 (FIG. 9) is implemented between the ingress stage 902 and the center stage 906, and a single stage of intermediate devices 512 is implemented between the center stage 906 and the egress stage 910. While this is one possible embodiment, it should be noted that, if so desired, the intermediate devices may be implemented in multiple stages. An example of a two-stage intermediate device implementation for the ingress side of a switching array is shown in FIG. 12, wherein a first stage 1210 of intermediate devices is implemented in series with a second stage 1220 of intermediate devices. Implementing multiple stages of intermediate devices in this way may enable an array to be further expanded without requiring extraordinary intermediate devices as well as provides more flexibility in the physical construction of a large switching array. FIG. 12 shows a two-stage implementation. Implementations with more intermediate device stages are possible and are within the scope of the present invention.

Note that from a functional standpoint, a multi-stage intermediate device implementation may be viewed as a single-stage implementation. That is, the two stages 1210, 1220 of intermediate devices of FIG. 12 could be functionally reduced to a single intermediate device stage 1230. What this means is that given a certain desired intermediate device stage functionality, any number of stages of intermediate devices may be implemented to achieve that functionality. The number of stages that are actually implemented is a matter of design choice.

At this point, it should be noted that although the invention has been described with reference to one or more specific embodiments, it should not be construed to be so limited. Various modifications may be made by those of ordinary skill in the art with the benefit of this disclosure without departing from the spirit of the invention. One simple example is that a plurality of intermediate devices can be combined into a single larger physical device. Thus, the invention should not be limited by the specific embodiments used to illustrate it but only by the scope of the appended claims.

What is claimed is:

1. A Clos switching network, comprising:
   a first switching stage comprising a plurality of first stage switching devices;
   a second switching stage comprising a plurality of second stage switching devices; and
   a distribution stage coupled to said first switching stage and said second switching stage, said distribution stage configured to receive a plurality of bandwidth units (BU's) from each first stage switching device, and to distribute at least one BU from each first stage switching device to each second stage switching device, such that each second stage switching device is assured of receiving at least one BU from each first stage switching device, and wherein said distribution stage comprises mapping circuitry configured to provide fixed mapping of BU's and said distribution stage is not a dynamically configurable switching device;
   wherein the distribution stage enables a Clos architecture in the switching network without requiring physical ports from each of the plurality of first stage switching devices to physical ports on each of the plurality of second stage switching devices;
   wherein said distribution stage distributes a uniform number of BU's from each of said first stage switching devices to each of said second stage switching devices; and
   wherein the distribution stage enables said Clos architecture with a total number of physical ports from the plurality of first stage switching devices less than the total number of physical ports to the plurality of second stage switching devices.

2. The switching network of claim 1, wherein said distribution stage is configured in accordance with a BU distribution configuration, and wherein said BU distribution configuration is static comprising a fixed mapping of the plurality of bandwidth units from the first switching stage to the second switching stage, wherein said fixed mapping ensures that each second stage switching device is assured of receiving at least one BU from each first stage switching device.

3. The switching network of claim 1, wherein said distribution stage is coupled to at least one of said second stage switching devices via a link, wherein said distribution stage combines at least one BU from a plurality of said first stage switching devices to derive a set of combined BU's, and wherein said distribution stage sends said set of combined BU's on said link such that said link comprises at least one BU from a plurality of said first stage switching devices.

4. The switching network of claim 1, wherein said first stage comprises an ingress stage, and wherein said second stage comprises a center stage;
wherein said center stage comprises a quantity of physical ports less than the quantity of first stage switching devices in the first stage; and
wherein said center stage comprises logical links through the distribution device to the first stage satisfying requirements of said Clos architecture.

5. The switching network of claim 4, wherein said distribution stage comprises a first distribution subset, said first distribution subset coupled to a first subset of said first stage switching devices and coupled to all of said second stage switching devices, said first distribution subset distributing at least one BU from each of said first stage switching devices in said first subset to each of said second stage switching devices.

6. The switching network of claim 5, wherein said distribution stage further comprises a second distribution subset, said second distribution subset coupled to a second subset of said first stage switching devices and coupled to all of said second stage switching devices, said second distribution subset distributing at least one BU from each of said first stage switching devices in said second subset to each of said second stage switching devices.

7. The switching network of claim 5, wherein said first distribution subset comprises at least one intermediate device, said intermediate device coupled to each of said first stage switching devices in said first subset of first stage switching devices, and coupled to a first subset of said second stage switching devices, said intermediate device distributing at least one BU from each of said first stage switching devices in said first subset of first stage switching devices to each of said second stage switching devices in said first subset of second stage switching devices.

8. The switching network of claim 1, wherein said first stage comprises a center stage, and wherein said second stage comprises an egress stage.

9. The switching network of claim 8, wherein said distribution stage comprises a first distribution subset, said first distribution subset coupled to all of said first stage switching devices and coupled to a first subset of said second stage switching devices, said first distribution subset distributing at least one BU from each of said first stage switching devices to each of said second stage switching devices in said first subset.

10. The switching network of claim 9, wherein said distribution stage further comprises a second distribution subset, said second distribution subset coupled to all of said first stage switching devices and coupled to a second subset of said second stage switching devices, said second distribution subset distributing at least one BU from each of said first stage switching devices to each of said second stage switching devices in said second subset.

11. The switching network of claim 9, wherein said first distribution subset comprises at least one intermediate device, said intermediate device coupled to a first subset of said first stage switching devices, and coupled to each of said second stage switching devices in said first subset of second stage switching devices, said intermediate device distributing at least one BU from each of said first stage switching devices in said first subset of first stage switching devices to each of said second stage switching devices in said first subset of second stage switching devices.

12. The switching network of claim 1, wherein said distribution stage comprises a plurality of intermediate devices configured to implement BU distribution.

13. The switching network of claim 12, wherein at least one of said intermediate devices comprises:
a plurality of inputs, each input coupled to receive a plurality of BU's from a corresponding input link;
a plurality of outputs, each output coupled to a corresponding output link; and
a distribution mechanism coupled to each of said inputs and each of said outputs, said distribution mechanism configured to distribute at least one BU from each of said inputs to each of said outputs, such that each of said outputs is assured of receiving at least one BU from each of said inputs.

14. The switching network of claim 13, wherein said distribution mechanism is configured in accordance with a BU distribution configuration, and wherein said distribution configuration is static.

15. The switching network of claim 13, wherein at least one of said intermediate devices comprises a dynamically configurable switching device which has been statically configured.

16. The switching network of claim 1, wherein said distribution stage comprises a plurality of intermediate stages coupled in series, each intermediate stage configured to implement BU distribution.

17. A Clos switching network, comprising:
an ingress stage comprising a plurality of ingress switching devices;
a center stage comprising a plurality of center stage switching devices;
an egress stage comprising a plurality of egress switching devices;
a first distribution stage couple to said ingress stage and said center stage, said first distribution stage configured to receive a plurality of bandwidth units (BU's) from each ingress switching device, and to distribute at least one BU from each ingress switching device to each center stage switching device, such that each center stage switching device is assured of receiving at least one BU from each ingress switching device, and wherein said first distribution stage comprises mapping circuitry configured to provide fixed mapping of BU's and said first distribution stage is not a dynamically configurable switching device; and
a second distribution stage couple to said center stage and said egress stage, said second distribution stage configured to receive a plurality of bandwidth units (BU's) from each center stage switching device, and to distribute at least one BU from each center stage switching device to each egress switching device, such that each egress switching device is assured of receiving at least one BU from each center stage switching device, and wherein said second distribution stage comprises mapping circuitry configured to provide fixed mapping of BU's and said second distribution stage is not a dynamically configurable switching device;

wherein the first distribution stage enables a Clos architecture in the switching network without requiring physical ports from each of the plurality of ingress switching devices to physical ports on each of the plurality of center stage switching devices;

wherein the second distribution stage enables the Clos architecture in the switching network without requiring physical ports from each of the plurality of center stage switching devices to physical ports on each of the plurality of egress switching devices;

wherein said second distribution stage is configured in accordance with a second BU distribution configuration, wherein said second BU distribution configuration is static; and wherein the first distribution stage enables said Clos architecture with a total number of physical ports from the plurality of ingress switching devices less than the total number of physical ports to the plurality of center stage switching devices.

18. The switching network of claim 17, wherein said first distribution stage is configured in accordance with a first BU distribution configuration, and wherein said first BU distribution configuration is static comprising a fixed mapping of the plurality of bandwidth units from the ingress stage to the center stage, wherein said fixed mapping ensures that each center stage switching device is assured of receiving at least one BU from each ingress switching device.

19. The switching network of claim 17, wherein said first distribution stage is coupled to at least one of said center stage switching devices via a first link, wherein said first distribution stage combines at least one BU from a plurality of said ingress switching devices to derive a first set of combined BU's, and wherein said first distribution stage sends said first set of combined BU's on said first link such that said first link comprises at least one BU from a plurality of said ingress switching devices.

20. The switching network of claim 19, wherein said second distribution stage is coupled to at least one of said egress switching devices via a second link, wherein said second distribution stage combines at least one BU from a plurality of said center stage switching devices to derive a second set of combined BU's, and wherein said second distribution stage sends said second set of combined BU's on said second link such that said second link comprises at least one BU from a plurality of said center stage switching devices.

21. The switching network of claim 17, wherein said first distribution stage distributes a uniform number of BU's from each of said ingress switching devices to each of said center stage switching devices.

22. The switching network of claim 21, wherein said second distribution stage distributes a uniform number of BU's from each of said center stage switching devices to each of said egress switching devices.

23. The switching network of claim 17, wherein said switching network qualifies as a Clos array.

24. An apparatus, comprising:
a plurality of first stage switching devices;
a plurality of second stage switching devices; and
a distribution stage coupled to said plurality of first stage switching devices and said plurality of second stage switching devices, the distribution stage comprising:
a plurality of inputs coupled to the plurality of first stage switching devices;
a plurality of outputs coupled to the plurality of second stage switching devices; and
a distribution configuration coupled between said plurality of inputs and said plurality of outputs, configured to receive a plurality of bandwidth units (BU's) from each first stage switching device, and to distribute at least one BU from each first stage switching device to each second stage switching device, such that each said second stage switching switch device receives at least one BU from each said first stage switching device, and wherein said distribution configuration comprises mapping circuitry configured to provide fixed mapping of BU's and said second distribution stage is not a dynamically configurable switching device;

wherein the distribution stage enables a Clos architecture in the apparatus without requiring physical ports from each of the plurality of first stage switching devices to physical ports on each of the plurality of second stage switching devices thereby providing a reduction in physical ports on both the plurality of first stage switching and the plurality of second stage switching devices; and wherein the distribution stage enables said Clos architecture with a total number of physical ports from the plurality of first stage switching devices less than the total number of physical ports to the plurality of second stage switching devices.

25. The apparatus of claim 24, wherein said distribution configuration is configured in accordance with a BU distribution configuration, and wherein said BU distribution configuration is static comprising a fixed mapping of the plurality of bandwidth units from the first stage switching device to the second stage switching device, wherein said fixed mapping ensures that said second stage switching device is assured of receiving at least one BU from each first stage switching device.

26. The apparatus of claim 24, wherein said distribution configuration distributes a Q number of BU's from each of said plurality of inputs to each of said plurality of outputs, and said apparatus comprises a B number of outputs, wherein each input receives a C number of BU's, and wherein $C/Q=B$.

27. The apparatus of claim 26, wherein said apparatus comprises an A number of inputs, wherein each output receives a D number of BU's from said plurality of inputs, and wherein $D=A*Q$.

28. The apparatus of claim 27, wherein said apparatus comprises an A number of inputs and a B number of outputs, wherein each input receives a C number of BU's, wherein each output receives a D number of BU's from said plurality of inputs, and wherein $A*C=B*D$.

29. The apparatus of claim 24, wherein said distribution configuration comprises a combiner, said combiner coupled to a corresponding output, and said combiner receives at least one BU from each of said plurality of inputs, combines the received BU's into an output stream, and outputs said output stream to said corresponding output.

30. The apparatus of claim 29, wherein said combiner comprises a multiplexer.

31. The apparatus of claim 30, wherein said distribution mechanism comprises a plurality of buffers, each buffer coupled to a corresponding input to store information received on said corresponding input, and said combiner is coupled to each of said plurality of buffers.

32. The apparatus of claim 31, wherein said distribution configuration further comprises a controller, wherein said controller causes each of said buffers to output Q BU's to said combiner, and wherein said controller causes said combiner to receive and to combine the received BU's to derive said output stream and to output said output stream to said corresponding output.

* * * * *